(12) United States Patent
Lee

(10) Patent No.: US 6,633,425 B2
(45) Date of Patent: Oct. 14, 2003

(54) ELECTRO-ABSORPTION TYPED OPTICAL MODULATOR

(75) Inventor: Sang-Dong Lee, Yongin-shi (KR)

(73) Assignee: Samsung Electronics Co., LTD, Suwon (KR)

(*) Notice: Subject to any disclaimer, the term of this patent is extended or adjusted under 35 U.S.C. 154(b) by 210 days.

(21) Appl. No.: 09/812,311

(22) Filed: Mar. 20, 2001

(65) Prior Publication Data

US 2001/0024312 A1 Sep. 27, 2001

(30) Foreign Application Priority Data

Mar. 23, 2000 (KR) ......................................... 2000-14821

(51) Int. Cl.[7] .............................. G02F 1/01; H01L 29/06
(52) U.S. Cl. ...................... 359/245; 359/248; 359/254; 257/14; 257/33.008
(58) Field of Search ................................. 359/245–248, 359/254, 260; 257/14, 80, 94, 96, 98, 101, 458, 33.008; 385/1, 2, 3, 8

(56) References Cited

U.S. PATENT DOCUMENTS 4,679,061 A * 7/1987 Capasso et al. ................ 257/21
5,530,580 A * 6/1996 Thompson et al. ......... 359/248

* cited by examiner

Primary Examiner—Scott J. Sugarman
Assistant Examiner—Darryl J. Collins
(74) Attorney, Agent, or Firm—Cha & Reiter

(57) ABSTRACT

An improved electro-absorption semiconductor modulator using an external modulation, in which a multi-quantum well (MQW) structure for absorbing a light beam is provided to increase an optical absorption capability according to an electric field, thus increasing an optical power difference between ON and OFF states. Accordingly, the electro-absorption semiconductor modulator includes a semiconductor substrate; a lower cladding layer deposited over the semiconductor substrate; a multi-quantum well (MQW) layer comprised of barrier layers and undoped well layers stacked, in succession, predetermined times on the lower cladding layer, the barrier layers being doped with an impurity; an upper cladding layer deposited over the multi-quantum well layer; and, an ohmic contact layer deposited over the upper cladding layer. The impurity comprises an n-type dopant such as silicon and has a doping density of $10^{17}/cm^3$.

8 Claims, 3 Drawing Sheets

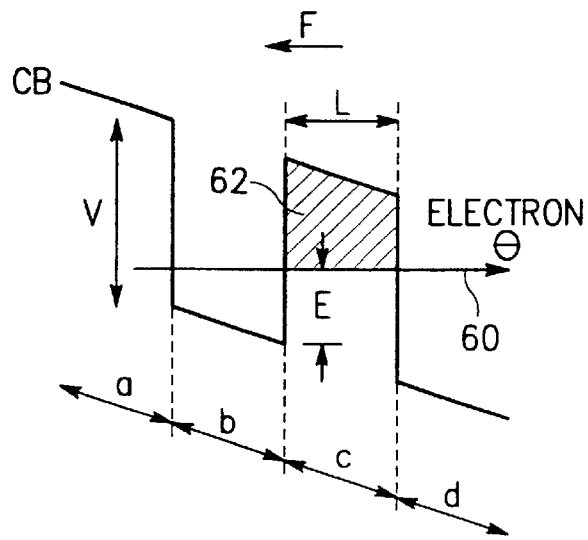
FIG. 1 [PRIOR ART]
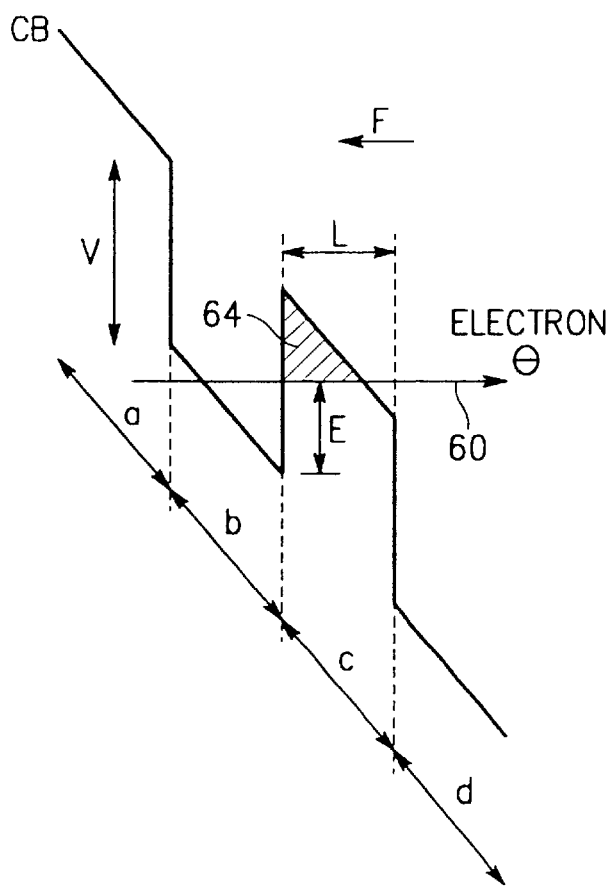
FIG. 2 [PRIOR ART]

ELECTRO-ABSORPTION TYPED OPTICAL MODULATOR

CLAIM OF PRIORITY

This application claims priority to an application entitled "Electro-Absorption Typed Optical Modulator" filed in the Korean Industrial Property Office on Mar. 23, 2000 and there duly assigned Ser. No. 2000-14821.

BACKGROUND OF THE INVENTION

1. Field of the Invention

The present invention relates generally to an optical communication device, and in particular, to an electro-absorption semiconductor modulator.

2. Description of the Related Art

It is highly desirable to efficiently modulate optical signals in an optical communication system. As is known, electro-optical modulators absorb or transmit optical pulses sent from a laser source, on the basis of an electrical command, towards their surface. At their output duly coded digital signals can be obtained to be transmitted by optical fibers. There are two modulation techniques in optical telecommunications system, a direct optical modulation and an external optical modulation. The direct optical modulation modulates a signal by adjusting the current flowing into a laser diode, whereas the external optical modulation passes a light beam using a separate modulator.

Electro-optical modulators are typically fabricated on a III-V element substrate with a "p-I-n" structure. For example, InGaAs(P)/InGaAsP or InGa(Al)As/InAlAs is routinely used as a multi-quantum well (MQW) structure to absorb light in optical modulator. In the former case (where InGaAs(P)/InGaAsP is used for the MQW), the conduction band (CB) has a low energy band offset (of below 100 mV), which is shown in the energy band diagram of FIG. 1. In FIGS. 1 and 2, "a" denotes a barrier layer, "b" denotes a quantum well layer, "V" denotes an energy band offset of the conduction band, "E" denotes a first energy level of the electrons in the conduction band, "L" denotes a width of the barrier layer, "CB" denotes a conduction band, and "F" denotes a forward electric field. Accordingly, when an electric field is applied to such an optical modulator, a rectangular barrier layer 62 indicating the first energy level of electrons in the conduction band changes to a triangular barrier layer 64, as shown in FIG. 2. In this case, a bonding force among the electrons in the conduction band inside the quantum well is drastically reduced, resulting in a drastic decrease in an optional absorption force (or absorption threshold shifts) in the optical modulator.

SUMMARY OF THE INVENTION

The present invention relates to an improved electro-absorption semiconductor modulator in which a multi-quantum well (MQW) structure for absorbing a light beam is configured to increase an optical absorption capability according to the electric field therein, thus increasing the optical power difference between ON and OFF states.

Accordingly, there is provided an electro-absorption semiconductor modulator comprising a semiconductor substrate; a lower cladding layer deposited over the semiconductor substrate; a multi-quantum well (MQW) layer comprised of barrier layers and undoped well layers stacked in succession on the lower cladding layer, the barrier layers are doped with an impurity; an upper cladding layer deposited over the multi-quantum well layer; and, an ohmic contact layer deposited over the upper cladding layer.

Preferably, the impurity comprises an n-type dopant such as silicon.

Preferably, the impurity has a doping density of $10^{17}/cm^3$.

BRIEF DESCRIPTION OF THE DRAWINGS

The advantages of the present invention will become more apparent from the following detailed description when taken in conjunction with the accompanying drawings in which:

FIG. 1 illustrates an energy band diagram of the conduction band for the barrier layer in an MQW layer according to a conventional electro-absorption semiconductor modulator;

FIG. 2 illustrates an energy band diagram of the barrier layer in the MQW layer after an electric field is applied according to a conventional electro-absorption semiconductor modulator;

DETAILED DESCRIPTION OF THE PREFERRED EMBODIMENT

A preferred embodiment of the present invention will be described herein below with reference to the accompanying drawings. For the purpose of simplicity and clarity, well-known functions or constructions are not described in detail as they would obscure the invention in unnecessary detail.

The present invention aims to improve the capability of an electro-absorption optical modulator. To achieve this, an electron bonding force of the conduction band of the quantum well is increased by reducing the voltage drop across a barrier layer. This is achieved by doping the barrier layer of the MQW structure using a silicon dopant, which has a short diffusion distance. The doping of the barrier layer helps to prevent a decrease in an optical absorption force caused by the energy barrier layer when an electric field is applied to the optical modulator, as illustrated in FIGS. 1 and 2. The change in shape of the barrier layer to a triangle due to the electric field results in a reduction in an optical absorption force of the device. Therefore, it is possible to improve an optical absorption capability and increase the optical power difference between the ON and OFF states of the modulator by changing the electric field characteristic in the MQW structure. Furthermore, it is now possible to operate the optical modulator with a low voltage, thus increasing an operating bandwidth.

Figure 3:
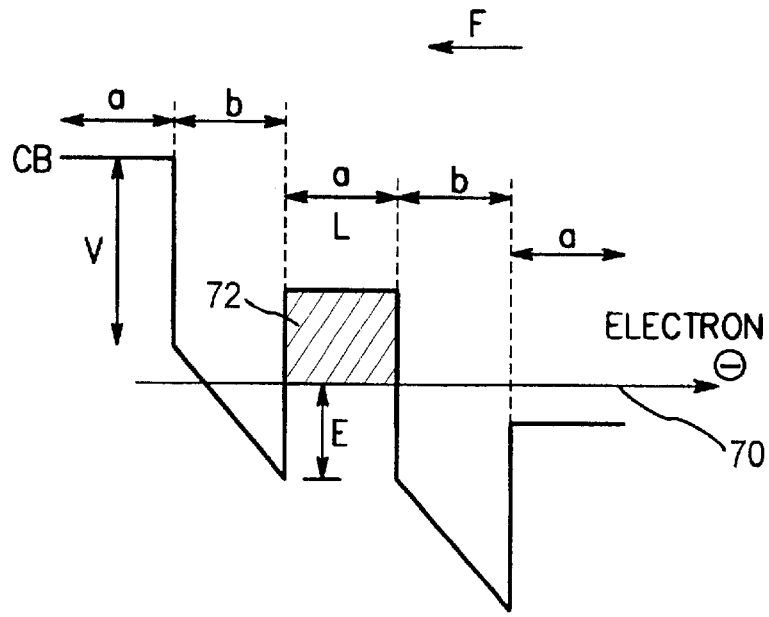
FIG. 3 illustrates an energy band diagram of the conductance band for the barrier layer in an MQW layer after an electric field is applied to an electro-absorption semiconductor modulator according to an embodiment of the present invention.

FIG. 3 shows an energy band diagram of the electro-absorption optical modulator with an improved MQW structure according to an embodiment of the present invention. The barrier layer of the MQW structure is doped with silicon to exhibit the rectangular energy band 72 bounded by a line 70 indicating the first energy level of electrons in the conduction band.

Figure 4:
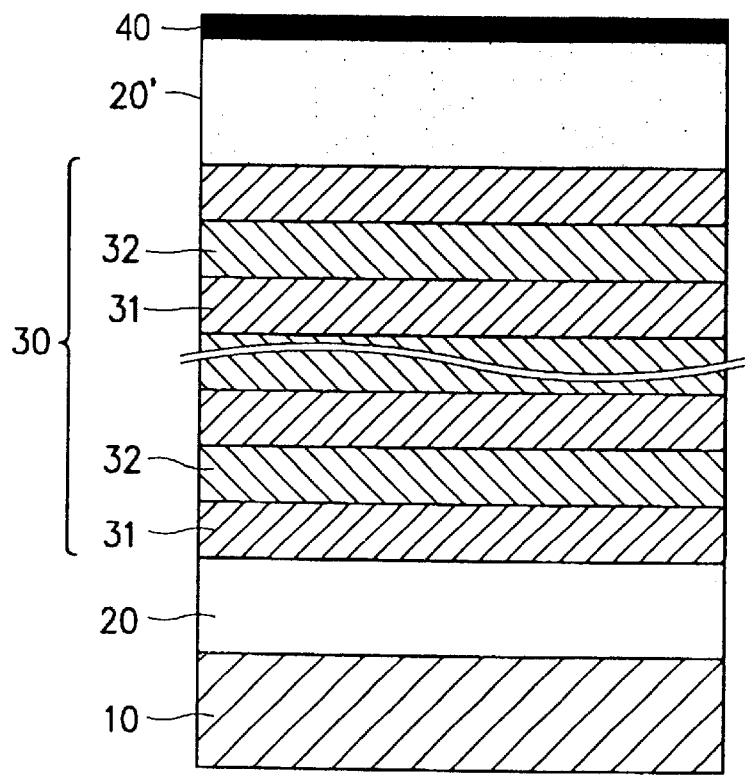
FIG. 4 is a cross sectional view illustrating the structure of an electro-absorption semiconductor modulator according to an embodiment of the present invention; and, FIG. 5 is a graph illustrating an electric field-to-wave function leakage characteristic of the electro-absorption semiconductor modulator with an InGaAsP/InGaAsP MQW structure according to an embodiment of the present invention.

FIG. 4 shows a cross sectional view of an electro-absorption optical modulator with an improved MQW structure according to an embodiment of the present invention.

Referring to FIG. 4, the electro-absorption optical modulator according to the present invention has a stacked structure of a semiconductor substrate 10, a lower cladding layer 20, a multi-quantum well (MQW) layer 30 formed by alternately stacking an n-barrier layer 31 and an undoped well layer 32 in succession, an upper cladding layer 20', and an ohmic contact layer 40. The principle of the present invention is directed to doping the n-barrier layer 31 of the multi-quantum well layer 30 with silicon. The prior art modulator does not include such a doped barrier layer.

In operation, the barrier layer 31 is doped with n-type silicon dopant having a short diffusion distance to decrease the resistance of the barrier layer 31, thereby preventing a voltage drop across the barrier layer 31. Preferably, the barrier layer 31 is doped with a doping density of about $10^{17}/cm^3$. Hence, the electrons in the conduction band of the multi-quantum well layer 30 to which the electric field is applied, are restricted to one another by the barrier layer 31, thus exhibiting energy band having the rectangular shape 72 of FIG. 3. Thus, there remain increased number of electrons in the well layer 32 and an increase in the overlap integral between the electron and the hole, which in turn increases the optical absorption coefficient. In addition, the increase in the optical absorption coefficient causes an increase in an optical absorption force of the optical modulator. In the OFF state where the electric field is applied to the optical modulator, this increase in optical absorption causes an increase in optical power, thus making it possible for the optical modulator to operate with a low voltage.

Figure 5:
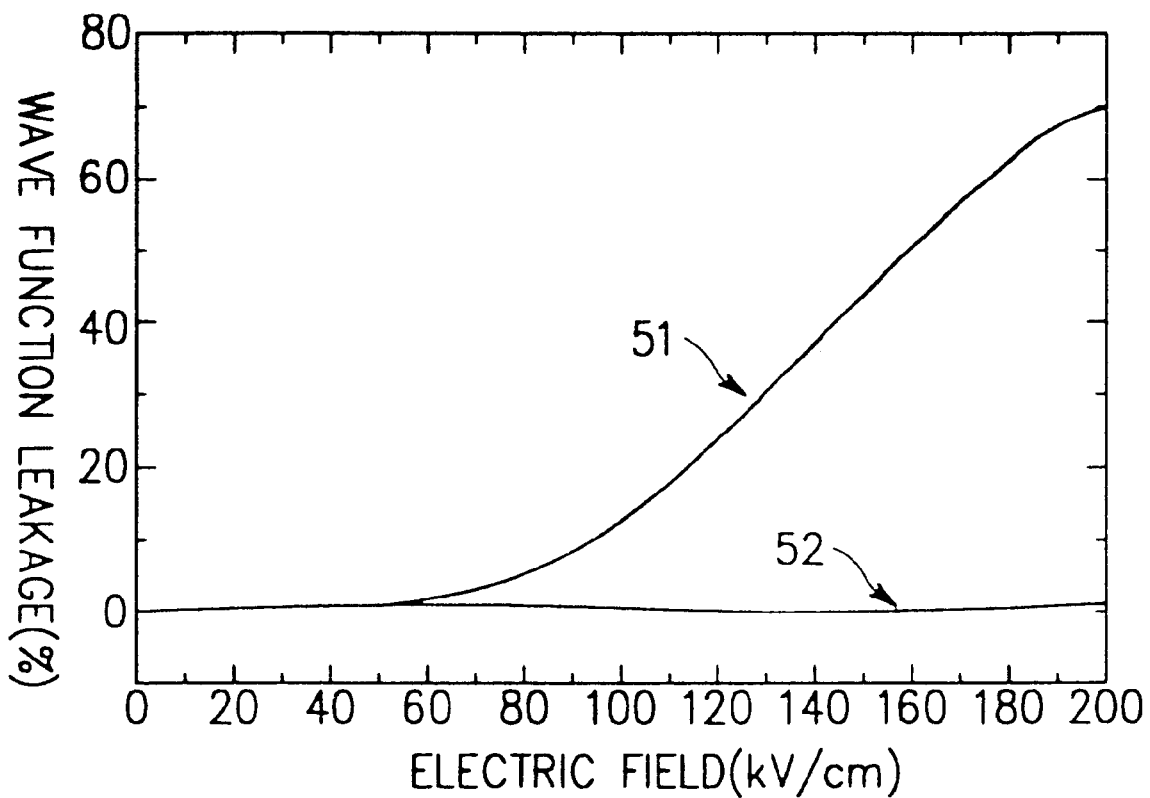

FIG. 5 shows an electric field-to-wave function leakage characteristic of the electro-absorption optical modulator with an InGaAsP/InGaAsP multi-layered MQW layer according to the embodiment of the present invention and the conventional optical modulator. In FIG. 5, reference numeral 51 indicates an electric field-to-wave function leakage characteristic curve of the conventional optical modulator with an InGaAsP/InGaAsP multi-layered MQW having the triangular battier layer 64 of FIG. 2, and reference numeral 52 indicates the same having a rectangular barrier layer 72 of FIG. 3 according to the present invention. The electric field-to-wave function leakage characteristic values of the InGaAsP/InGaAsP MQW layer are calculated using Equations (1) and (2) below according to the Wentwel-Kamers-Brillouin effect.

$$T_{rect} \sim \exp\left\{\frac{2L\sqrt{2}\,m}{\hbar}\left[(V-E)^{\frac{1}{2}} - \frac{1}{4}FL(V-E)^{\frac{1}{2}}\right]\right\} \quad (1)$$

$$T_{tri} \sim \exp\left\{-\frac{4\sqrt{2}\,m}{3F\hbar}\left[(V-E)^{\frac{3}{2}}\right]\right\} \quad (2)$$

Equation (1) indicates a wave function leakage of the barrier layer having a rectangular energy band (FIG. 3), and Equation (2) indicates a wave function leakage of the barrier layer having a triangular energy band (FIG. 2).

As described above, the electro-absorption optical modulator according to the present invention increases the bonding force among electrons in the multi-quantum well of the conduction band by decreasing a voltage drop across the barrier layer. To achieve this, the MQW barrier layer is doped using an n-type dopant, such as silicon, which in turn prevents a decrease in the optical absorption force when electric field applied thereto. By doing so, it is possible to increase the optical absorption capability, thus increasing an optical power difference between the ON and OFF states of the inventive modulator. In addition, it is possible to operate the device with a low voltage. By doping the barrier layer of the MQW layer with a silicon dopant having a short diffusion distance, the optical absorption increases in the OFF state where the electric field is applied to the optical modulator, leading to an increase in an ON/OFF ratio. Accordingly, it is possible not only to increase the transmittable distance but also possible to operate the optical modulator at a low voltage, thus making is possible to increase the operating bandwidth.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. An electro-absorption semiconductor modulator, comprising:

a semiconductor substrate;

a lower cladding layer deposited over said semiconductor substrate;

a multi-quantum well (MQW) layer comprised of barrier layers and undoped well layers stacked in succession predetermined times over said lower cladding layer, said barrier layers being doped with an impurity comprising silicon;

an upper cladding layer deposited over said multi-quantum well layer; and, an ohmic contact layer deposited over said upper cladding layer.

2. The electro-absorption modulator of claim 1, wherein the impurity comprises an n-type dopant.

3. The electro-absorption modulator of claim 1, wherein the impurity has a doping density of $10^{17}/cm^3$.

4. The electro-absorption modulator of claim 1, wherein said MQW layer increases an optical absorption capability of said modulator.

5. An electro-absorption semiconductor modulator, comprising:

a semiconductor substrate;

a lower cladding layer deposited over said semiconductor substrate;

a multi-quantum well (MQW) layer comprised of barrier layers and undoped well layers stacked in succession predetermined times over said lower cladding layer, said barrier layer being doped with an impurity having a doping density of about $10^{17}/cm^3$;

an upper cladding layer deposited over said multi-quantum well layer, and, an ohmic contact layer deposited over said upper cladding layer.

6. The electro-absorption modulator of claim 5, wherein the impurity comprises an n-type dopant.

7. The electro-absorption modulator of claim 5, wherein the impurity comprises silicon.

8. The electro-absorption modulator of claim 5, wherein said MQW layer increases an optical absorption capability of said modulator.

* * * * *